US012784982B2

(12) United States Patent
Jeong et al.

(10) Patent No.: US 12,784,982 B2
(45) Date of Patent: Nov. 3, 2026

(54) MULTILAYER ELECTRONIC COMPONENT HAVING IMPROVED MOISTURE RESISTANCE RELIABILITY

(71) Applicant: SAMSUNG ELECTRO-MECHANICS CO., LTD., Suwon-si (KR)

(72) Inventors: Young Bin Jeong, Suwon-si (KR); Hyung Jong Choi, Suwon-si (KR); Kwan Hee Yun, Suwon-si (KR); Hyun Tak Kim, Suwon-si (KR); Jin Sung Lee, Suwon-si (KR); Boo Min Noh, Suwon-si (KR); Min Woo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 138 days.

(21) Appl. No.: 18/813,587

(22) Filed: Aug. 23, 2024

(65) Prior Publication Data

US 2025/0157737 A1 May 15, 2025

(30) Foreign Application Priority Data

Nov. 10, 2023 (KR) ........................ 10-2023-0154963

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/30* (2013.01); *H01G 4/12* (2013.01)

(58) Field of Classification Search
CPC ......... H01G 4/2325; H01G 4/232; H01G 4/30
See application file for complete search history.

(56) References Cited

U.S. PATENT DOCUMENTS

| | | | |
|---|---|---|---|
| 6,124,769 | A | 9/2000 | Igarashi et al. |
| 2018/0166215 | A1 | 6/2018 | Hamanaka et al. |

(Continued)

FOREIGN PATENT DOCUMENTS

| | | | | |
|---|---|---|---|---|
| EP | 0777242 | A2 * | 6/1997 | .............. H01G 4/12 |
| JP | 2023-009629 | A | 1/2023 | |
| KR | 10-2000-0069266 | A | 11/2000 | |

OTHER PUBLICATIONS

Extended European Search Report dated Aug. 1, 2025 issued in the corresponding European Patent Application No. 24196436.0.

*Primary Examiner* — Eric W Thomas
(74) *Attorney, Agent, or Firm* — Morgan, Lewis & Bockius LLP

(57) ABSTRACT

A multilayer electronic component includes: a body including a dielectric layer and internal electrodes alternately disposed while having the dielectric layer interposed therebetween; and external electrodes disposed outside the body, wherein the external electrode includes a lower electrode layer including copper (Cu) and in contact with the internal electrode, an upper electrode layer including silver (Ag) and disposed on the lower electrode layer, and an alloy layer including a copper (Cu)-silver (Ag) alloy and disposed at an interface between the lower electrode layer and the upper electrode layer, and an oxidation region including copper (Cu) oxide is disposed on at least a portion of an external surface of the lower electrode layer.

27 Claims, 5 Drawing Sheets

(56) References Cited

U.S. PATENT DOCUMENTS

| | | | |
|---|---|---|---|
| 2021/0057153 | A1 | 2/2021 | Jun et al. |
| 2023/0019604 | A1 | 1/2023 | Uchida et al. |

* cited by examiner

MULTILAYER ELECTRONIC COMPONENT HAVING IMPROVED MOISTURE RESISTANCE RELIABILITY

CROSS-REFERENCE TO RELATED APPLICATION(S)

This application claims benefit of priority to Korean Patent Application No. 10-2023-0154963 filed on Nov. 10, 2023, in the Korean Intellectual Property Office, the disclosure of which is incorporated herein by reference in its entirety.

TECHNICAL FIELD

The present disclosure relates to a multilayer electronic component.

In general, a multilayer ceramic capacitor (MLCC), one of multilayer electronic components, may be a chip-type condenser which is mounted on a printed circuit board of any of various electronic products, such as an imaging device such as a liquid crystal display (LCD) or a plasma display panel (PDP), a computer, a smartphone, or a mobile phone, to serve to charge or discharge electricity therein or therefrom. The MLCC may be used as a component of any of various electronic apparatuses because the MLCC is small, has high capacity, and is easily mounted.

In recent years, an external electrode is being thinned to miniaturize the MLCC. However, as the external electrode becomes thinner, external moisture or plating solution may easily penetrate into a capacitor body. In general, the external electrode may be formed by a dipping method. However, the external electrode formed by the dipping method may not have a constant thickness, and the external moisture or plating solution may penetrate into the body through a thin portion of the body.

Accordingly, there is a need for research on a structure of the external electrode for preventing lower moisture resistance reliability of the MLCC by blocking a moisture penetration path shortened by the thinner external electrode.

SUMMARY

An aspect of the present disclosure is to provide a multilayer electronic component having improved moisture resistance reliability.

However, the present disclosure is not limited to the description described above, and may be more readily understood in the description of exemplary embodiments of the present disclosure.

According to an aspect of the present disclosure, a multilayer electronic component includes: a body including a dielectric layer and internal electrodes alternately disposed while having the dielectric layer interposed therebetween; and external electrodes disposed on the body, wherein the external electrodes include a lower electrode layer including copper (Cu) and in contact with the internal electrode, an upper electrode layer including silver (Ag) and disposed on the lower electrode layer, an alloy layer including a copper (Cu)-silver (Ag) alloy and disposed at an interface between the lower electrode layer and the upper electrode layer, and an oxidation region including copper (Cu) oxide is disposed on at least a portion of an external surface of the lower electrode layer.

According to an aspect of the present disclosure, a multilayer electronic component includes: a body including a dielectric layer and internal electrodes alternately disposed while having the dielectric layer interposed therebetween; and external electrodes disposed on the body, wherein the external electrodes include a lower electrode layer including copper (Cu) and is in contact with the internal electrode, an upper electrode layer including silver (Ag) and disposed on the lower electrode layer, an oxidation region including copper (Cu) oxide, and a copper (Cu)-silver (Ag) alloy disposed at an interface between the lower electrode layer and the upper electrode layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
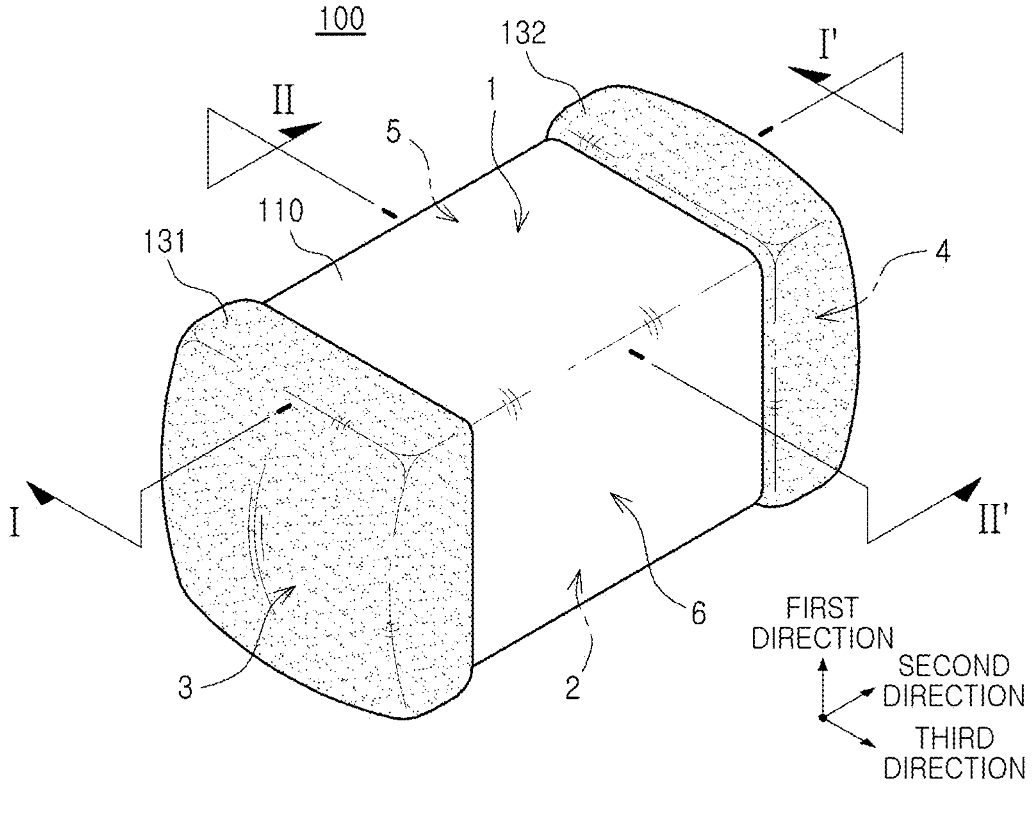
FIG. 1 is a perspective view schematically illustrating a multilayer electronic component according to an exemplary embodiment of the present disclosure.

Hereinafter, exemplary embodiments of the present disclosure will now be described in detail with reference to the accompanying drawings. The exemplary embodiments of the present disclosure may be modified in many different forms and the scope of the present disclosure should not be limited to the exemplary embodiments set forth herein. In addition, the exemplary embodiments of the present disclosure are provided to more fully explain the present disclosure to those skilled in the art. In the drawings, the shapes and dimensions may thus be exaggerated for clarity, and the same reference numerals are used to designate the same or like components.

Further, in the accompanying drawings, portions unrelated to the description will be omitted in order to clearly describe the present disclosure, and the size and thickness of each component shown in the drawings are arbitrarily shown for convenience of explanation. Therefore, the present disclosure is not necessarily limited to contents shown in the drawings. Furthermore, like reference numerals will be used to designate like components having similar functions throughout the drawings within the scope of the present disclosure. In addition, throughout the specification, when an element "includes" another component, it is to be understood that the element may further include a third component rather than excluding the third component, unless explicitly described to the contrary.

In the drawings, a first direction may indicate a thickness (T) direction, a second direction may indicate a length (L) direction, and a third direction may indicate a width (W) direction.

Multilayer Electronic Component

FIG. 1 is a perspective view schematically illustrating a multilayer electronic component according to an exemplary embodiment of the present disclosure.

Figure 2:
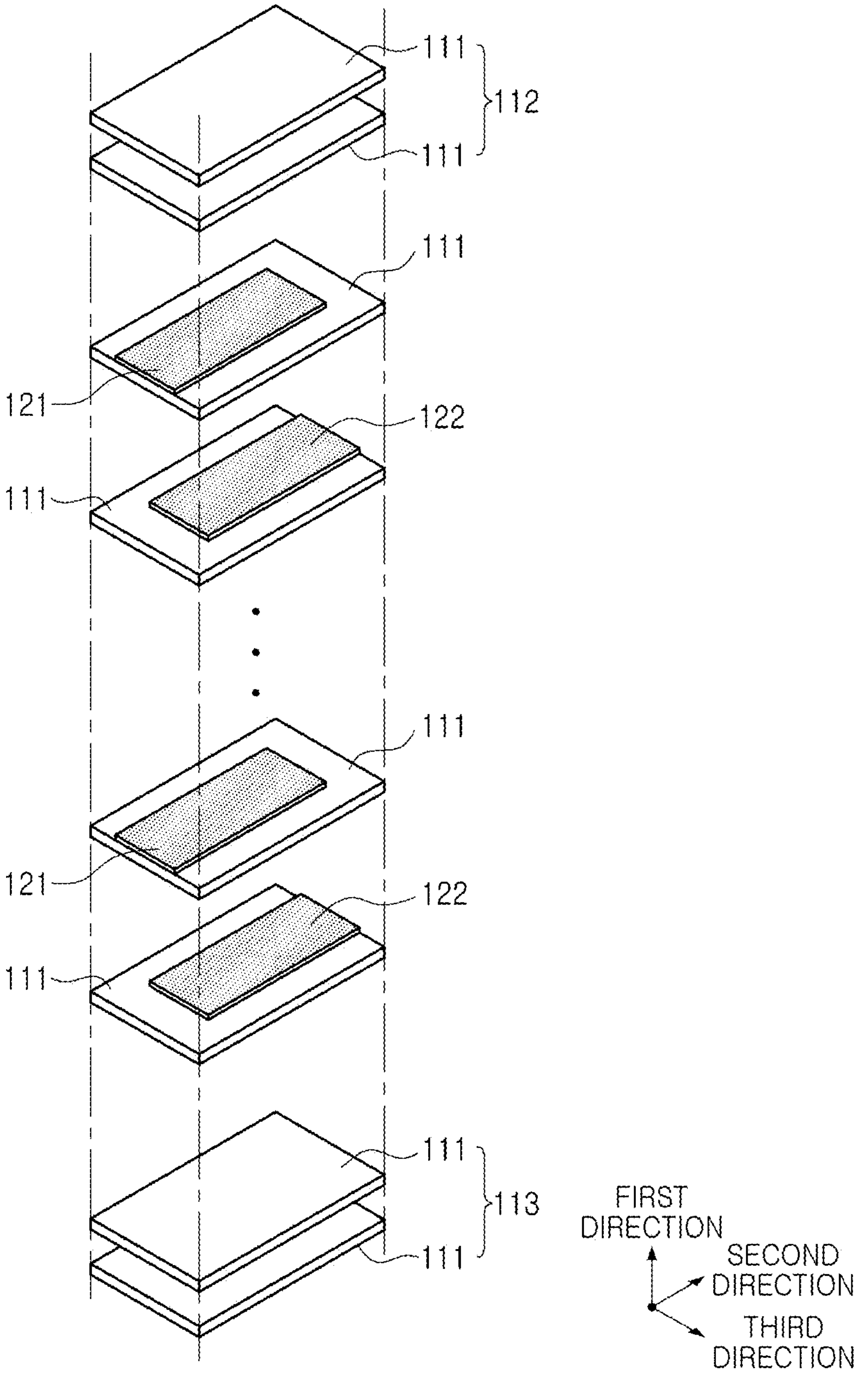
FIG. 2 is an exploded perspective view schematically illustrating the body in FIG. 1.

FIG. 2 is an exploded perspective view schematically illustrating the body in FIG. 1.

Figure 3:
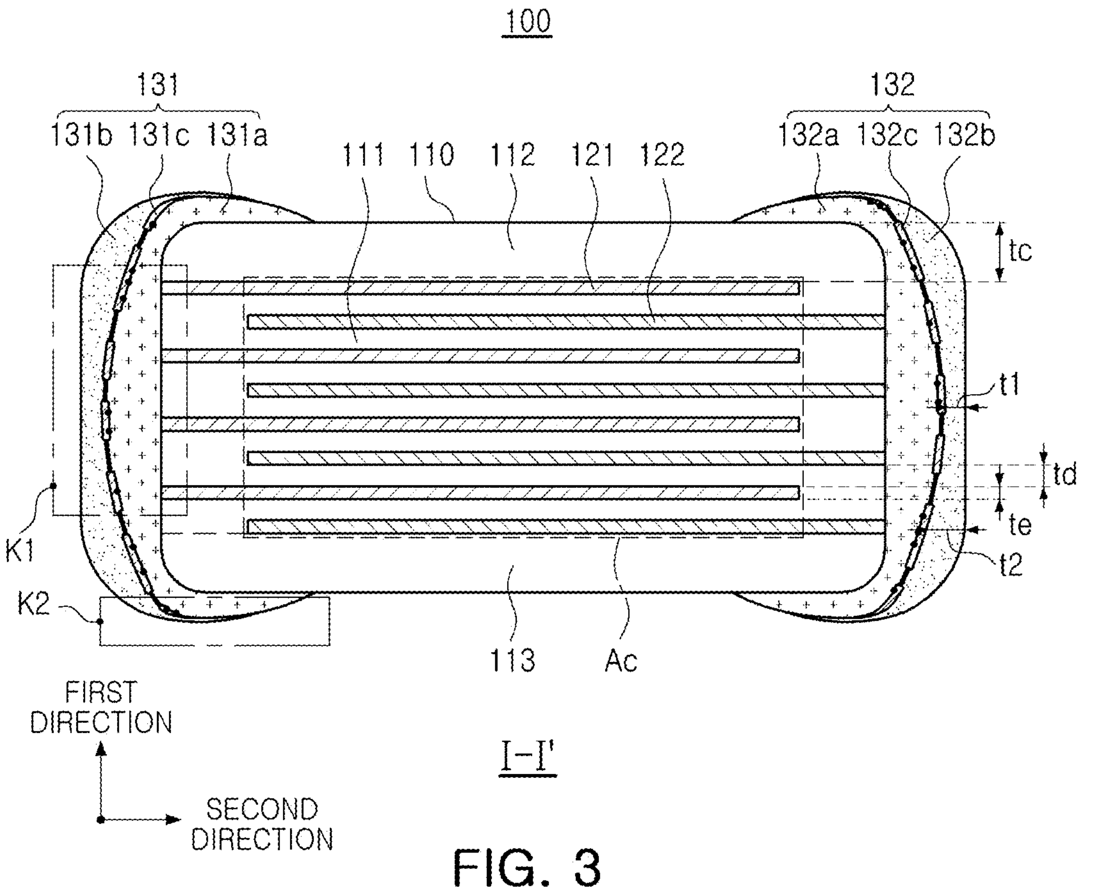
FIG. 3 is a cross-sectional view schematically illustrating section I-I' in FIG. 1.

FIG. 3 is a cross-sectional view schematically illustrating section I-I' in FIG. 1.

Figure 4:
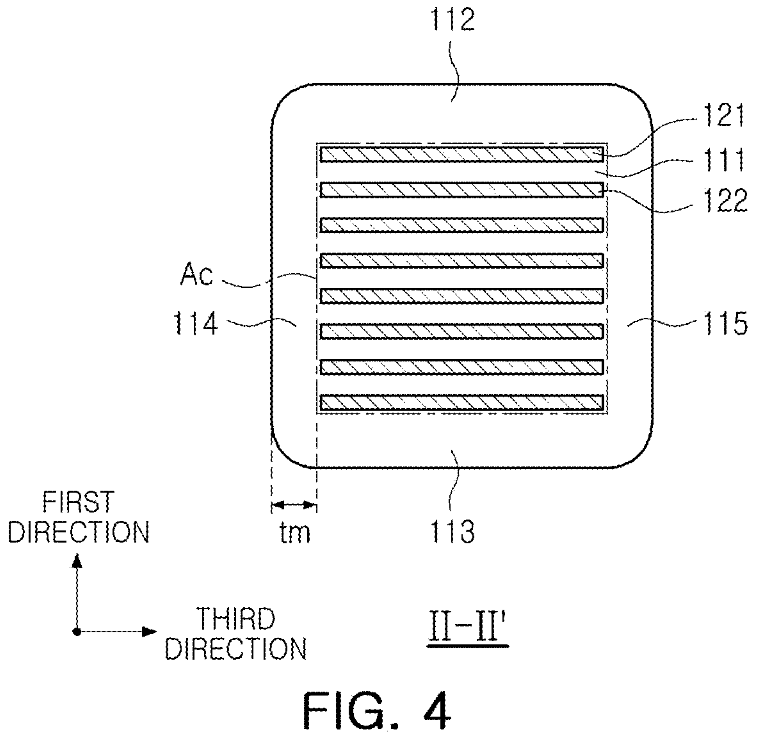
FIG. 4 is a cross-sectional view schematically illustrating section II-II' in FIG. 1.

FIG. 4 is a cross-sectional view schematically illustrating section II-II' in FIG. 1.

Figure 5:
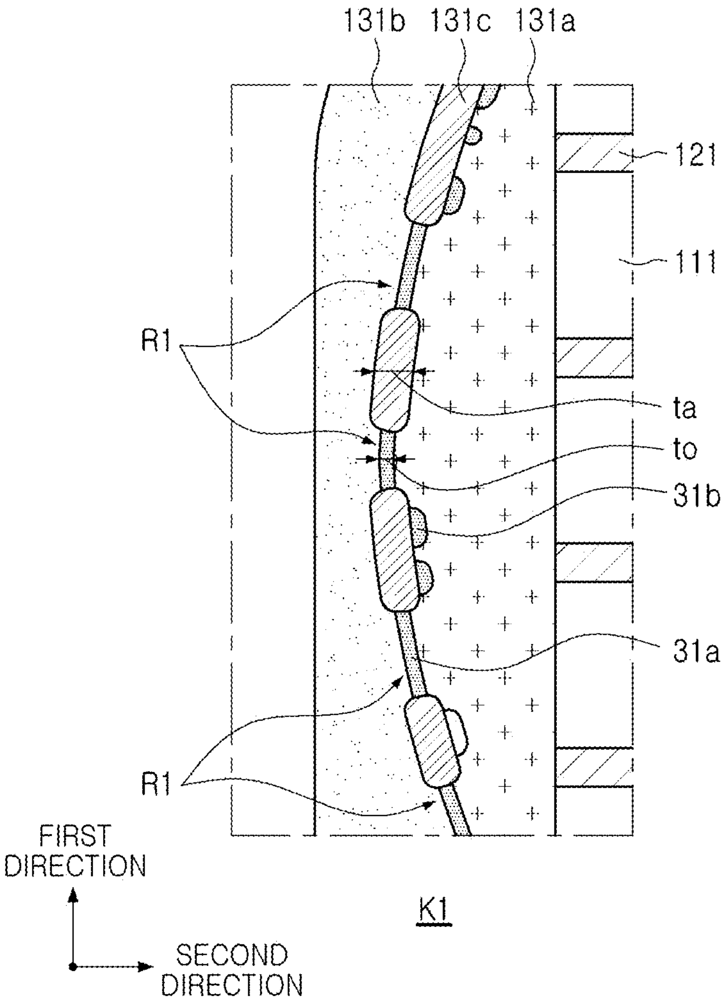
FIG. 5 is an enlarged view of region K1 in FIG. 3.

FIG. 5 is an enlarged view of region K1 in FIG. 3.

Figure 6:
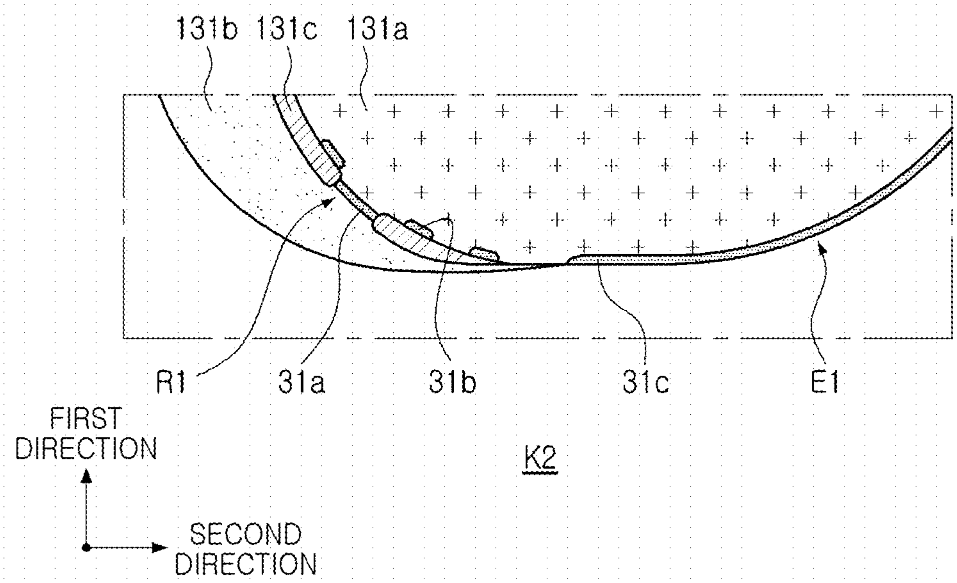
FIG. 6 is an enlarged view of region K2 in FIG. 3.

FIG. 6 is an enlarged view of region K2 in FIG. 3.

Hereinafter, a multilayer electronic component 100 according to an exemplary embodiment of the present disclosure is described in detail with reference to FIGS. 1 through 6. In addition, a multilayer ceramic capacitor (MLCC) is described as an example of the multilayer electronic component, is not limited thereto, and may be applied to various multilayer electronic components, for example, an inductor, a piezoelectric element, a varistor, or a thermistor.

The multilayer electronic component 100 according to an exemplary embodiment of the present disclosure may include a body 110 including a dielectric layer 111 and internal electrodes 121 and 122, and external electrodes 131 and 132 disposed on the body 110.

The body 110 is not particularly limited to a specific shape, and may have a hexahedral shape or a shape similar to the hexahedral shape, as shown in the drawings. The body 110 may not have a shape of the hexahedron having perfectly straight lines because a ceramic powder included in the body 110 is contracted during sintering process or edge of the body 110 may be polished. However, the body 110 may substantially have the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4, and opposing each other in the third direction.

The body 110 may include the dielectric layer 111 and the internal electrodes 121 and 122 alternately disposed while having the dielectric layer 111 interposed therebetween. The plurality of dielectric layers 111 included in the body 110 may already be sintered, and the adjacent dielectric layers 111 may thus be integrated with each other, thus making it difficult to confirm a boundary therebetween without using a scanning electron microscope (SEM).

The dielectric layer 111 may be formed by preparing a ceramic slurry including the ceramic powder, an organic solvent and a binder, applying the slurry on a carrier film and drying the same to prepare a ceramic green sheet, and then sintering the ceramic green sheet. The ceramic powder is not particularly limited as long as the capacitor acquires sufficient capacitance, and may use, for example, a barium titanate-based material, a lead composite perovskite-based material, or a strontium titanate-based material. The ceramic powder may be, for example, barium titanate ($BaTiO_3$) or $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$, in which calcium (Ca), zirconium (Zr) or the like is partially dissolved in $BaTiO_3$. The organic solvent may use ethanol or the like, the binder may use polyvinyl butyral or the like, and the organic solvent and the binder may use known materials used in the art.

The internal electrodes 121 and 122 may include, for example, the first internal electrode 121 and the second internal electrode 122 alternately disposed in the first direction while having the dielectric layer 111 interposed therebetween. That is, the first internal electrode 121 and the second internal electrode 122, which is a pair of electrodes having different polarities, may oppose each other while having the dielectric layer 111 interposed therebetween. The first internal electrode 121 and the second internal electrode 122 may be electrically insulated from each other by the dielectric layer 111 disposed therebetween.

The first internal electrode 121 may be spaced apart from the fourth surface 4 and may be connected to the first external electrode 131 on the third surface 3. The second internal electrode 122 may be spaced apart from the third surface 3 and may be connected to the second external electrode 132 on the fourth surface 4.

A conductive metal included in the internal electrode 121 or 122 may be at least one of nickel (Ni), copper (Cu), palladium (Pd), silver (Ag), gold (Au), platinum (Pt), tin (Sn), tungsten (W), titanium (Ti) and an alloy thereof, and is not limited thereto.

The internal electrode 121 or 122 may be formed by applying a conductive paste for an internal electrode that includes the conductive metal to a predetermined thickness on the ceramic green sheet and sintering the same. A method of printing the conductive paste for an internal electrode may be a screen printing method, a gravure printing method or the like, and is not limited thereto.

An average thickness td of the dielectric layers 111 and an average thickness te of the internal electrodes 121 or 122 is not limited. The average thickness td of the dielectric layers 111 and the average thickness of the internal electrodes 121 or 122 may be set arbitrarily based on a desired feature or purpose. However, in order to achieve the miniaturization and high capacitance of the multilayer electronic component 100, the average thickness td of the dielectric layers 111 may be 0.4 μm or more and 0.8 μm or less, and the average thickness te of the internal electrodes 121 or 122 may be 0.35 μm or more and 0.65 μm or less. In general, a reliability feature of the multilayer electronic component 100, such as its insulation resistance or breakdown voltage, may be lower as a thickness of the dielectric layer 111 or that of the internal electrode 121 or 122 is smaller. However, the reliability of the multilayer electronic component 100 according to an exemplary embodiment of the present disclosure may be secured by the external electrode 131 or 132 of the multilayer electronic component 100 that has a multilayer structure described below even when the average thickness td of the dielectric layers 111 and the average thickness te of the internal electrodes 121 or 122 satisfy the above range.

The average thickness td of the dielectric layers 111 and the average thickness te of the internal electrodes 121 or 122 may respectively indicate average sizes of the dielectric layers 111 and the internal electrodes 121 or 122 in the first direction. The average thickness td of the dielectric layers 111 and the average thickness te of the internal electrodes 121 or 122 may be measured by scanning a cross section of the body 110 in a first direction and a second direction by using the scanning electron microscope (SEM) at 10,000 magnification. In more detail, the average thickness td of the dielectric layers 111 may be acquired by measuring the thicknesses of the dielectric layer 111 at a plurality of points, for example, at thirty equally spaced points in the second direction, and then taking their average value. In addition, the average thickness te of the internal electrodes 121 or 122 may be acquired by measuring the thicknesses of the internal electrode 121 or 122 at a plurality of points, for example, at thirty equally spaced points in the second direction, and then taking their average value. The thirty equally spaced points may be specified in a capacitance formation portion Ac. Meanwhile, it is possible to acquire the more general average thickness td of the dielectric layers 111 and the more general average thickness te of the internal electrodes 121 or

122 when measuring each average value by extending a measurement target of the average value to ten dielectric layers 111 or ten internal electrodes 121 or 122.

The body 110 may include the capacitance formation portion Ac disposed in the body 110 and forming capacitance by including the first and second internal electrodes 121 and 122 alternately disposed while having the dielectric layer 111 interposed therebetween, and a first cover portion 112 and a second cover portion 113 disposed on both surfaces of the capacitance formation portion Ac that oppose each other in the first direction. The cover portion 112 or 113 may basically serve to prevent damage to the internal electrode that is caused by a physical or chemical stress. The cover portion 112 or 113 may have a configuration similar to that of the dielectric layer 111 except that the cover portion includes no internal electrode.

An average thickness tc of the cover portions 112 or 113 is not limited. In order to achieve the miniaturization and high capacitance of the multilayer electronic component 100, the average thickness tc of the cover portions 112 or 113 may be 30 μm or less, and is not limited thereto. In an exemplary embodiment of the present disclosure, the reliability of the multilayer electronic component 100 may be secured by the external electrode 131 or 132 having the multilayer structure described below even when the average thickness tc of the cover portions 112 or 113 is 30 μm or less. Here, the average thickness tc of the cover portions 112 or 113 may indicate an average thickness of each of the first cover portion 112 and the second cover portion 113.

The average thickness tc of the cover portions 112 or 113 may indicate an average size of the cover portions 112 or 113 in the first direction, and may be an average value of their sizes in the first direction that are measured at five points equally spaced in the second direction in the cross section of the body 110 in the first direction and the second direction, passing through the center of the body 110 in the third direction.

The body 110 may include a first margin portion 114 and a second margin portion 115 respectively disposed on both surfaces of the capacitance formation portion Ac that oppose each other in the third direction. That is, the margin portion 114 or 115 may indicate a region between each end of the internal electrode 121 or 122 and a boundary surface of the body 110 in a cross section of the body 110 that is cut in a first direction and a third direction.

The margin portion 114 or 115 may have a configuration similar to that of the dielectric layer 111 except that the margin portion includes no internal electrode. The margin portion 114 or 115 may basically serve to prevent the internal electrode 121 or 122 from being damaged due to the physical or chemical stress.

The margin portion 114 or 115 may be formed by applying the conductive paste for an internal electrode on the ceramic green sheet and sintering the same, except for a region where the margin portion is to be formed. Alternatively, in order to suppress a step portion caused by the internal electrode 121 or 122, the margin portion 114 or 115 may be formed by cutting the stacked internal electrodes 121 or 122 to be exposed through the fifth or sixth surface 5 or 6 of the body, and then stacking one dielectric layer or two or more dielectric layers on each of the two surfaces of the capacitance formation portion Ac that oppose each other in the third direction.

An average thickness tm of the margin portions 114 or 115 is not limited. In order to achieve the miniaturization and high capacity of the multilayer electronic component 100, the average thickness tm of the margin portions 114 or 115 may be 30 μm or less, and is not limited thereto. In an exemplary embodiment of the present disclosure, the reliability of the multilayer electronic component 100 may be secured by the external electrode 131 or 132 having the multilayer structure described below even when the average thickness tm of the margin portions 114 or 115 is 30 μm or less. Here, the average thickness tm of the margin portions 114 or 115 may indicate an average thickness of each of the first margin portion 114 and the second margin portion 115.

The average thickness tm of the margin portions 114 or 115 may indicate an average size of the margin portions 114 or 115 in the third direction, and may be an average value of their sizes in the third direction that are measured at five points equally spaced in the first direction in the cross section of the body 110 in the first direction and a third direction, passing through the center of the body 110 in the second direction.

The external electrodes 131 and 132 may respectively be disposed on the third and fourth surfaces 3 and 4 of the body 110, and extend to portions of the first, second, fifth and sixth surfaces 1, 2, 5, and 6. The external electrodes 131 and 132 may include the first external electrode 131 connected to the first internal electrode 121 and the second external electrode 132 connected to the second internal electrode 122. Hereinafter, the description describes a structure of the multilayer electronic component 100 having two external electrodes 131 and 132, the structure is not limited thereto, and the number or shape of the external electrodes 131 and 132 may be changed based on the shape of the internal electrode 121 or 122 or another purpose.

The external electrode 131 or 132 may include a lower electrode layer 131*a* or 132*a* in contact with the internal electrode 121 or 122, an upper electrode layer 131*b* or 132*b* disposed on the lower electrode layer 131*a* or 132*a*, and an alloy layer 131*c* or 132*c* disposed at an interface between the lower electrode layer 131*a* or 132*a* and the upper electrode layer 131*b* or 132*b*. That is, the first external electrode 131 may include the first lower electrode layer 131*a* in contact with the first internal electrode 121, the first upper electrode layer 131*b* disposed on the first lower electrode layer 131*a*, and the first alloy layer 131*c* disposed at the interface between the first lower electrode layer 131*a* and the first upper electrode layer 131*b*. The second external electrode 132 may include the second lower electrode layer 132*a* in contact with the second internal electrode 122, the second upper electrode layer 132*b* disposed on the second lower electrode layer 132*a*, and the second alloy layer 132*c* disposed at the interface between the second lower electrode layer 132*a* and the second upper electrode layer 132*b*.

The lower electrode layer 131*a* or 132*a* may include copper (Cu). In addition, the lower electrode layer 131*a* or 132*a* may include glass. Glass included in the lower electrode layer 131*a* or 132*a* may include one or more oxides of barium (Ba), calcium (Ca), zinc (Zn), aluminum (Al), boron (B), and silicon (Si), and is not limited thereto.

The lower electrode layer 131*a* or 132*a* may include copper (Cu) as its main component. For example, a ratio of an area occupied by copper (Cu) to a total area of the lower electrode layer 131*a* or 132*a* may be 80% or more when analyzing the cross section of the multilayer electronic component 100 in the first direction and the second direction, passing through the center of the multilayer electronic component 100 in the third direction, by using the scanning electron microscopy (SEM) and energy dispersive spectroscopy (EDS). For example, the ratio of the area occupied by copper (Cu) to the total area of the lower electrode layer 131*a* or 132*a* may be greater than a ratio of an area occupied by an element other than copper (Cu) to the total area of the lower electrode layer 131_a_ or 132_a_, in the cross section of the multilayer electronic component 100 in the first direction and the second direction, passing through the center of the multilayer electronic component 100 in the third direction. Here, the total area of the lower electrode layer 131_a_ or 132_a_ may indicate the total area occupied by the lower electrode layer 131_a_ or 132_a_ in an image analyzed by the SEM-EDS. The image may be an image showing the entire lower electrode layer 131_a_ or 132_a_, or may be an enlarged image of a portion of the lower electrode layer 131_a_ or 132_a_. Meanwhile, copper (Cu) may be detected in the lower electrode layer 131_a_ or 132_a_, and silver (Ag) may not be detected therein when performing the analysis thereon by using the energy dispersive spectroscopy (EDS).

The lower electrode layer 131_a_ or 132_a_ may basically serve to electrically connect the internal electrode 121 or 122 to the external electrode 131 or 132. In particular, the internal electrode 121 or 122 may include nickel (Ni). In this case, copper (Cu) in the lower electrode layer 131_a_ or 132_a_ may diffuse to the internal electrode 121 and 122 in its sintering process to form a Ni—Cu alloy, thereby improving connectivity between the internal electrode 121 or 122 and the external electrode 131 or 132.

A thickness of the lower electrode layer 131_a_ or 132_a_ is not limited. For example, the thickness of the lower electrode layer 131_a_ or 132_a_ at its central region in the first direction may be 20 μm or less in the cross section of the body 110 in the first direction and the second direction, passing through the center of the body 110 in the third direction, and is not limited thereto.

The lower electrode layer 131_a_ or 132_a_ may be formed by dipping the third and fourth surfaces 3 and 4 of the body 110 into a copper (Cu) paste including a copper (Cu) powder, glass, the binder, the organic solvent, or the like, and then sintering the Cu paste.

The upper electrode layer 131_b_ or 132_b_ may include silver (Ag). In addition, the upper electrode layer 131_b_ or 132_b_ may include glass. Glass included in the upper electrode layer 131_b_ or 132_b_ may include one or more oxides of barium (Ba), calcium (Ca), zinc (Zn), aluminum (Al), boron (B), and silicon (Si), and is not limited thereto.

The upper electrode layer 131_b_ or 132_b_ may include silver (Ag) as its main component. For example, a ratio of an area occupied by silver (Ag) to a total area of the upper electrode layer 131_b_ or 132_b_ may be 80% or more when analyzing the cross section of the multilayer electronic component 100 in the first direction and the second direction, passing through the center of the multilayer electronic component 100 in the third direction, by using the scanning electron microscopy (SEM) and energy dispersive spectroscopy (EDS). For example, the ratio of the area occupied by silver (Ag) to the total area of the upper electrode layer 131_b_ or 132_b_ may be greater than a ratio of an area occupied by an element other than silver (Ag) to the total area of the upper electrode layer 131_b_ or 132_b_, in the cross section of the multilayer electronic component 100 in the first direction and the second direction, passing through the center of the multilayer electronic component 100 in the third direction. Here, the total area of the upper electrode layer 131_b_ or 132_b_ may indicate the total area occupied by the upper electrode layer 131_b_ or 132_b_ in the image analyzed by the SEM-EDS. The image may be an image showing the entire upper electrode layer 131_b_ or 132_b_, or may be an enlarged image of a portion of the upper electrode layer 131_b_ or 132_b_. Meanwhile, silver (Ag) may be detected in the upper electrode layer 131_b_ or 132_b_, and copper (Cu) may not be detected therein when performing the analysis thereon by using the energy dispersive spectroscopy (EDS).

A method of forming the upper electrode layer 131_b_ or 132_b_ is not limited. For example, in order to achieve the thin external electrode 131 or 132, the upper electrode layer 131_b_ or 132_b_ may be formed by printing a silver (Ag) paste including a silver (Ag) powder, glass, the binder, the organic solvent, or the like on the lower electrode layer 131_a_ or 132_a_ by using the screen printing method and then sintering the same. Alternatively, the upper electrode layer 131_b_ or 132_b_ may be formed by attaching a conductive sheet including the silver (Ag) powder, glass, the binder, or the like to the lower electrode layer 131_a_ or 132_a_ and then sintering the same. A sintering process to form the upper electrode layer 131_b_ or 132_b_ may be performed at a temperature of 600° C. or more and 850° C. or less, and is not limited thereto.

Meanwhile, the upper electrode layer 131_b_ or 132_b_ may be formed by printing the silver (Ag) paste on the lower electrode layer 131_a_ or 132_a_ by using the screen printing method and then sintering the same. In this case, an end of the lower electrode layer 131_a_ or 132_a_ may not be covered by the upper electrode layer 131_b_ or 132_b_.

A thickness of the upper electrode layer 131_b_ or 132_b_ is not limited. However, t2>t1 where t1 indicates the thickness of the upper electrode layer that is measured in a central region of the body 110 in the first direction, and t2 indicates the thickness of the upper electrode layer that is measured based on the outermost internal electrode of the internal electrodes in the first direction, in the cross section of the body 110 in the first direction and the second direction, passing through the center of the body 110 in the third direction. As shown in FIG. 3, the lower electrode layer 131_a_ or 132_a_ may have a maximμm thickness at its center in the first direction when formed using the dipping method. Here, the upper electrode layer 131_b_ or 132_b_ may be thin and flat at its central portion in the first direction and thick at its outer portion in the first direction when formed on the lower electrode layer 131_a_ or 132_a_ by using the screen printing method. Accordingly, t2 may be greater than t1. t2 does not need to be particularly limited, and may be, for example, 8 μm or less. Thicknesses, t1 and t2, may be determined by scanning electron microscopy (SEM) and image processing software. Other methods and/or tools appreciated by one of ordinary skill in the art, even if not described in the present disclosure, may also be used.

The alloy layer 131_c_ or 132_c_ may include a copper (Cu)-silver (Ag) alloy. That is, the external electrode 131 or 132 may include the Cu—Ag alloy disposed at the interface between the lower electrode layer 131_a_ or 132_a_ and the upper electrode layer 131_b_ or 132_b_. The alloy layer 131_c_ or 132_c_ may be formed by a mutual reaction between copper (Cu) in the lower electrode layer 131_a_ or 132_a_ and silver (Ag) in the upper electrode layer 131_b_ or 132_b_ when the upper electrode layer 131_b_ or 132_b_ is formed by sintering the Ag paste. The alloy layer 131_c_ or 132_c_ may be disposed discontinuously at the interface between the lower electrode layer 131_a_ or 132_a_ and the upper electrode layer 131_b_ or 132_b_. That is, the Cu—Ag alloy may be disposed discontinuously at the interface between the lower electrode layer 131_a_ or 132_a_ and the upper electrode layer 131_b_ or 132_b_. The Cu—Ag alloy included in the alloy layer 131_c_ or 132_c_ may include oxygen (O). That is, copper (Cu), silver (Ag), and oxygen (O) may all be detected in the alloy layer 131_c_ or 132_c_ when performing the analysis thereon by using the energy dispersive spectroscopy (EDS).

The alloy layer 131_c_ or 132_c_ may serve to prevent external moisture from penetrating into the body 110. That is, in an exemplary embodiment of the present disclosure, the external electrode 131 or 132 may include the alloy layer 131*c* or 132*c*, thereby improving moisture resistance reliability of the multilayer electronic component 100.

Meanwhile, each of the lower electrode layer 131*a* or 132*a* and the upper electrode layer 131*b* or 132*b* may be formed by sintering the conductive paste and include a number of pores, and the alloy layer 131*c* or 132*c* formed by the reaction between the lower electrode layer 131*a* or 132*a* and the upper electrode layer 131*b* or 132*b* may also include the pores. However, in an exemplary embodiment, an average size of the pores included in the alloy layer 131*c* or 132*c* may be smaller than an average size of the pores included in the upper electrode layer 131*b* or 132*b*. That is, an average size of the pores included in the Cu—Ag alloy may be smaller than the average size of the pores included in the upper electrode layer 131*b* or 132*b*. The pore may be a path through which the external moisture penetrates into the body 110. The average size of the pores included in the alloy layer 131*c* or 132*c* may be smaller than the average size of the pores included in the upper electrode layer 131*b* or 132*b*, thus more effectively preventing the external moisture penetration. The average size of the pores included in the alloy layer 131*c* or 132*c* and the average size of the pores included in the upper electrode layer 131*b* or 132*b* may be determined by scanning electron microscopy (SEM) and image processing software. Other methods and/or tools appreciated by one of ordinary skill in the art, even if not described in the present disclosure, may also be used.

In an exemplary embodiment, a ratio of an area of the alloy layer 131*c* or 132*c* to a total area of the external electrode 131 or 132 may be 25% or less in the cross section of the body 110 in the first direction and the second direction, passing through the center of the body 110 in the third direction. That is, a ratio of an area of the Cu—Ag alloy to the total area of the external electrode 131 or 132 may be 25% or less in the cross section of the body 110 in the first direction and the second direction, passing through the center of the body 110 in the third direction. For example, a ratio of an area of the first alloy layer 131*c* to a total area of the first external electrode 131 may be 25% or less, and a ratio of an area of the second alloy layer 132*c* to a total area of the second external electrode 132 may be 25% or less, in the cross section of the body 110 in the first direction and the second direction, passing through the center of the body 110 in the third direction. Here, the total area of the external electrode 131 or 132 may indicate a total area of the lower electrode layer 131*a* or 132*a*, the upper electrode layer 131*b* or 132*b*, and the alloy layer 131*c* or 132*c*.

The multilayer electronic component 100 may have lower capacitance when the ratio of the area of the alloy layer 131*c* or 132*c* to the total area of the external electrode 131 or 132 is more than 25%. Meanwhile, the ratio of the area of the alloy layer 131*c* or 132*c* to the total area of the external electrode 131 or 132 may be 4% or more. That is, the ratio of the area of the Cu—Ag alloy to the total area of the external electrode 131 or 132 may be 4% or more. The moisture resistance reliability of the present disclosure may be insignificantly improved when the ratio of the area of the alloy layer 131*c* or 132*c* is less than 4% of the total area of the external electrode 131 or 132.

Hereinafter, the description describes the external electrode of the multilayer electronic component 100 according to an exemplary embodiment of the present disclosure in more detail with reference to FIGS. 5 and 6. FIGS. 5 and 6 show an enlarged portion of the first external electrode 131. However, the first external electrode 131 and the second external electrode 132 have substantially the same composition. Therefore, the following description is considered to include descriptions of both the first external electrode 131 and the second external electrode 132.

Referring to FIGS. 5 and 6, an oxidation region 31*a*, 31*b*, or 31*c* including copper (Cu) oxide may be disposed on at least a portion of an external surface of the lower electrode layer 131*a*. That is, the lower electrode layer 131*a* may include the oxidation region 31*a*, 31*b*, or 31*c*, which includes the copper (Cu) oxide. As shown in FIGS. 5 and 6, the oxidation region 31*a*, 31*b*, or 31*c* may be disposed discontinuously. Copper (Cu) and oxygen (O) may be detected in the oxidation region 31*a*, 31*b*, or 31*c*, and silver (Ag) may not be detected when performing the analysis thereon by using the energy dispersive spectroscopy (EDS). An outer boundary of the oxidation region 31*a*, 31*b*, or 31*c* may be confirmed by a backscattered electron (BSE) image of the scanning electron microscope (SEM).

Copper (Cu) in the lower electrode layer 131*a* may have higher oxidation reactivity than silver (Ag) in the upper electrode layer 131*b*. Accordingly, the oxidation region 31*a*, 31*b*, or 31*c* may be formed in a process of forming, the alloy layer 131*c* by the reaction between copper (Cu) and silver (Ag) at the temperature of 600° C. or more, and then cooling the external surface of the heated lower electrode layer 131*a* when printing the Ag paste on the external surface of the lower electrode layer 131*a* and then sintering the same.

The oxidation region 31*a*, 31*b*, or 31*c*, together with the alloy layer 131*c*, may serve to prevent the external moisture from penetrating into the body 110. That is, the external electrode 131 may include the alloy layer 131*c* including the Cu—Ag alloy and the oxidation region 31*a*, 31*b*, or 31*c* including the copper (Cu) oxide, thereby more effectively improving the moisture resistance reliability of the multilayer electronic component 100.

The oxidation region 31*a*, 31*b*, or 31*c* may be formed in a region where it is easier for oxygen to penetrate from the outside to the external surface of the lower electrode layer 131*a* in the process of cooling the lower electrode layer 131*a*.

For example, at least a portion of the oxidation region may be disposed in a region R1 of the lower electrode layer 131*a* that is not covered by the alloy layer 131*c*. The first oxidation region 31*a* may define the oxidation region disposed in the region R1 of the lower electrode layer 131*a* that is not covered by the alloy layer 131*c*. The first oxidation region 31*a* may be disposed continuously in the region R1 of the lower electrode layer 131*a* that is not covered by the alloy layer 131*c*. That is, the first oxidation region 31*a* may be disposed continuously in the region of the lower electrode layer 131*a* that is not covered by the Cu—Ag alloy. The plurality of regions R1 of the lower electrode layer 131*a* that are not covered by the alloy layer 131*c* may be disposed.

The first oxidation region 31*a* may be further formed in a region more vulnerable to the moisture penetration compared to a region where the alloy layer 131*c* is formed, thereby suppressing the external moisture penetration. That is, the multilayer electronic component 100 according to an exemplary embodiment of the present disclosure may more effectively improve the moisture resistance reliability compared to a case where only the alloy layer 131*c* is formed.

For example, at least a portion of the oxidation region may be disposed at an interface between the lower electrode layer 131*a* and the alloy layer 131*c*. The second oxidation region 31*b* may define the oxidation region disposed at the interface between the lower electrode layer 131*a* and the alloy layer 131*c*. The second oxidation region 31*b* may be disposed discontinuously at the interface between the lower electrode layer 131*a* and the alloy layer 131*c*. That is, the second oxidation region 31*b* may be disposed discontinuously at an interface between the lower electrode layer 131*a* and the Cu—Ag alloy.

The second oxidation region 31*b* may be formed in a region where the alloy layer 131*c* is relatively thin, and is not limited thereto. Due to the alloy layer 131*c*, the second oxidation region 31*b* may have lower continuity than that of the first oxidation region 31*a*.

For example, at least a portion of the oxidation region may be disposed at an end E1 of the lower electrode layer. The third oxidation region 31*c* may define the oxidation region disposed at the end E1 of the lower electrode layer. The third oxidation region 31*c* may be disposed continuously or discontinuously at the end E1 of the lower electrode layer.

The alloy layer 131*c* may not be formed at the end E1 of the lower electrode layer when the end E1 of the lower electrode layer is not covered by the upper electrode layer 131*b*. Here, the third oxidation region 31*c* may be formed by oxygen that penetrating into the end E1 of the lower electrode layer where the alloy layer 131*c* is not disposed in the process of cooling the lower electrode layer. The third oxidation region 31*c* may be formed at the end E1 of the lower electrode layer, which may be an external moisture penetration path, thereby improving the moisture resistance reliability of the multilayer electronic component 100.

In an exemplary embodiment, the ratio of the area of the alloy layer 131*c* to the total area of the external electrode 131 may be greater than a ratio of areas of the oxidation regions 31*a*, 31*b*, and 31*c* to the total area of the external electrode 131, in at least one cross section of the body 110, passing through the body 110. That is, the ratio of the area of the Cu—Ag alloy to the total area of the external electrode 131 may be greater than the ratio of the areas of the oxidation regions 31*a*, 31*b*, and 31*c* to the total area of the external electrode 131, in at least one cross section of the body 110, passing through the body 110. At least one cross section of the body, passing through the body, may indicate, for example, the cross section of the body 110 in the first direction and the second direction, passing through the center of the body 110 in the third direction. A resistance of the multilayer electronic component 100 may be increased when the ratio of the areas of the oxidation regions 31*a*, 31*b*, and 31*c* to the total area of the external electrode 131 is greater than the ratio of the area of the alloy layer 131*c* to the total area of the external electrode 131. The area of the alloy layer 131*c* or 132*c*, the area of the Cu—Ag alloy, the total area of the external electrode 131 or 132, and the area of the oxidation regions 31*a*, 31*b*, and 31*c* may be determined by scanning electron microscopy (SEM) and energy dispersive spectroscopy (EDS). Other methods and/or tools appreciated by one of ordinary skill in the art, even if not described in the present disclosure, may also be used.

For example, the ratio of the areas of the oxidation regions 31*a*, 31*b*, and 31*c* to the total area of the external electrode 131 may be 4% or less in the cross section of the body 110, passing through the center of the body 110 in the third direction. Here, the total area of the external electrode 131 may indicate the total area of the lower electrode layer 131*a*, the upper electrode layer 131*b*, and the alloy layer 131*c*. The areas of the oxidation regions 31*a*, 31*b*, and 31*c* may indicate a total area of the oxidation regions 31*a*, 31*b*, and 31*c* included in the lower electrode layer 131*a*.

In an exemplary embodiment, a thickness ta of the alloy layer may be greater than a thickness to of the oxidation region. Here, the thickness ta of the alloy layer may indicate an average length of the alloy layers in the second direction, and the thickness to of the oxidation region may indicate an average length of the oxidation regions in the second direction. The resistance of the multilayer electronic component 100 may be increased when the thickness to of the oxidation region is greater than the thickness ta of the alloy layer.

The thickness ta of the alloy layer does not need to be particularly limited, and may be, for example, 1 μm to 2 μm. Meanwhile, the thickness to of the oxidation region may be 1 μm or less.

The thickness ta of the alloy layer and the thickness to of the oxidation region may be measured in the cross section of the body 110 in the first direction and the second direction, passing through the center of the body 110 in the third direction. That is, it is possible to acquire the image of the cross section of the body 110 in the first direction and the second direction, passing through the center of the body 110 in the third direction, which is captured using the scanning electron microscope, and then measure the thickness ta of the alloy layer and the thickness to of the oxidation region at a central region of the external electrode 131 in the first direction (for example, region K1 in FIG. 3) in the image. In addition, the thickness ta of the alloy layer may be an average thickness of the alloy layers, measured at any five or more points spaced apart from each other at the central region of the external electrode in the first direction. The thickness to of the oxidation region may be an average thickness of the oxidation regions, measured at any five or more points spaced apart from each other at the central region of the external electrode in the first direction. Other methods and/or tools appreciated by one of ordinary skill in the art, even if not described in the present disclosure, may also be used.

Meanwhile, although not shown, the external electrode 131 or 132 may further include a plating layer disposed on the upper electrode layer 131*b* or 132*b*. A type of the plating layer is not particularly limited, and may be a plating layer including nickel (Ni), tin (Sn), palladium (Pd), and/or an alloy including the same, and may include a plurality of layers. The plating layer may be, for example, a nickel (Ni) plating layer or a tin (Sn) plating layer, and may have the sequentially-formed Ni plating layer and Sn plating layer. In addition, the plating layer may include the plurality of Ni plating layers and/or the plurality of Sn plating layers.

As set forth above, according to the exemplary embodiments of the present disclosure, the multilayer electronic component may have the improved moisture resistance reliability.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:

a body including a dielectric layer and internal electrodes alternately disposed while having the dielectric layer interposed therebetween; and external electrodes disposed on the body, wherein the external electrodes include:

a lower electrode layer including copper (Cu) and in contact with the internal electrode, an upper electrode layer including silver (Ag) and disposed on the lower electrode layer, an alloy layer including a copper (Cu)-silver (Ag) alloy and disposed at an interface between the lower electrode layer and the upper electrode layer, and an oxidation region including copper (Cu) oxide is disposed on at least a portion of an external surface of the lower electrode layer.

2. The component according to claim 1, wherein the oxidation region is disposed discontinuously.

3. The component according to claim 1, wherein the alloy layer is disposed discontinuously, and at least a portion of the oxidation region is continuously disposed in a region of the lower electrode layer that is not covered by the alloy layer.

4. The component according to claim 1, wherein at least a portion of the oxidation region is disposed discontinuously at an interface between the lower electrode layer and the alloy layer.

5. The component according to claim 1, wherein an end of the lower electrode layer is not covered by the upper electrode layer, and at least a portion of the oxidation region is disposed at the end of the lower electrode layer.

6. The component according to claim 1, wherein, in at least one cross section passing through the body, a ratio of an area of the alloy layer to a total area of the external electrodes is greater than a ratio of an area of the oxidation region to the total area of the external electrodes.

7. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode disposed on the third and fourth surfaces, respectively, the first and second external electrodes each including the lower electrode layer, the upper electrode layer, the alloy layer, and the oxidation region, and in a cross section of the body in the first direction and the second direction, and passing through a center of the body in the third direction, a ratio of an area of the alloy layer to a total area of the external electrodes is 25% or less.

8. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode disposed on the third and fourth surfaces, respectively, the first and second external electrodes each including the lower electrode layer, the upper electrode layer, the alloy layer, and the oxidation region, and in a cross section of the body in the first direction and the second direction, and passing through a center of the body in the third direction, a ratio of an area of the oxidation region to a total area of the external electrodes is 4% or less.

9. The component according to claim 1, wherein a thickness of the alloy layer is greater than a thickness of the oxidation region.

10. The component according to claim 9, wherein the thickness of the oxidation region is 1 μm or less.

11. The component according to claim 1, wherein an average size of pores included in the alloy layer is smaller than an average size of pores included in the upper electrode layer.

12. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode disposed on the third and fourth surfaces, respectively, the first and second external electrodes each including the lower electrode layer, the upper electrode layer, the alloy layer, and the oxidation region, and in a cross section of the body in the first direction and the second direction, and passing through a center of the body in the third direction, $t2>t1$, where $t1$ indicates a thickness of the upper electrode layer measured in a central region of the body in a first direction, and $t2$ indicates a thickness of the upper electrode layer measured based on an outermost internal electrode of the internal electrodes in the first direction.

13. The component according to claim 1, wherein each of the lower electrode layer and the upper electrode layer further includes glass.

14. The component according to claim 1, wherein the lower electrode layer includes copper (Cu) as a main component, and the upper electrode layer includes silver (Ag) as a main component.

15. A multilayer electronic component comprising:

a body including a dielectric layer and internal electrodes alternately disposed while having the dielectric layer interposed therebetween; and external electrodes disposed on the body, wherein the external electrodes include:

a lower electrode layer including copper (Cu) and in contact with the internal electrode, an upper electrode layer including silver (Ag) and disposed on the lower electrode layer, an oxidation region including copper (Cu) oxide, and a copper (Cu)-silver (Ag) alloy disposed at an interface between the lower electrode layer and the upper electrode layer.

16. The component according to claim 15, wherein the oxidation region is disposed discontinuously.

17. The component according to claim 15, wherein the Cu—Ag alloy is disposed discontinuously, and at least a portion of the oxidation region is continuously disposed in a region of the lower electrode layer that is not covered by the Cu—Ag alloy.

18. The component according to claim 15, wherein at least a portion of the oxidation region is disposed discontinuously at an interface between the lower electrode layer and the Cu—Ag alloy.

19. The component according to claim 15, wherein an end of the lower electrode layer is not covered by the upper electrode layer, and at least a portion of the oxidation region is disposed at the end of the lower electrode layer.

20. The component according to claim 15, wherein, in at least one cross section passing through the body, a ratio of an area of the Cu—Ag alloy to a total area of the external electrodes is greater than a ratio of an area of the oxidation region to the total area of the external electrodes.

21. The component according to claim 15, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode disposed on the third and fourth surfaces, respectively, the first and second external electrodes each including the lower electrode layer, the upper electrode layer, the oxidation region, and the Cu—Ag alloy, and in a cross section of the body in the first direction and the second direction, and passing through a center of the body in the third direction, a ratio of an area of the Cu—Ag alloy to a total area of the external electrodes is 25% or less.

22. The component according to claim 15, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode disposed on the third and fourth surfaces, respectively, the first and second external electrodes each including the lower electrode layer, the upper electrode layer, the oxidation region, and the Cu—Ag alloy, and in a cross section of the body in the first direction and the second direction, and passing through a center of the body in the third direction, a ratio of an area of the oxidation region to a total area of the external electrodes is 4% or less.

23. The component according to claim 15, wherein a thickness of the oxidation region is 1 μm or less.

24. The component according to claim 15, wherein an average size of pores included in the Cu—Ag alloy is smaller than an average size of pores included in the upper electrode layer.

25. The component according to claim 15, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, disposed on the third and fourth surfaces, respectively, the first and second external electrodes each including the lower electrode layer, the upper electrode layer, the oxidation region, and the Cu—Ag alloy, and in a cross section of the body in the first direction and the second direction, and passing through a center of the body in the third direction, t2>t1, where t1 indicates a thickness of the upper electrode layer measured in a central region of the body in a first direction, and t2 indicates a thickness of the upper electrode layer measured based on an outermost internal electrode of the internal electrodes in the first direction.

26. The component according to claim 15, wherein each of the lower electrode layer and the upper electrode layer further includes glass.

27. The component according to claim 15, wherein the lower electrode layer includes copper (Cu) as a main component, and the upper electrode layer includes silver (Ag) as a main component.

* * * * *